United States Patent
Curtin (10) Patent No.: US 12,440,910 B2
(45) Date of Patent: Oct. 14, 2025

(54) PASTE RETAINER SYSTEMS AND METHODS FOR USE IN PASTE PRINTING SYSTEMS

(71) Applicant: Transition Automation, Inc., Tyngsboro, MA (US)

(72) Inventor: Mark J. Curtin, Groton, MA (US)

(73) Assignee: Transition Automation, Inc., Tyngsboro, MA (US)

( * ) Notice: Subject to any disclaimer, the term of this patent is extended or adjusted under 35 U.S.C. 154(b) by 976 days.

(21) Appl. No.: 16/932,147

(22) Filed: Jul. 17, 2020

(65) Prior Publication Data

US 2021/0016378 A1    Jan. 21, 2021

Related U.S. Application Data (60) Provisional application No. 62/880,277, filed on Jul. 30, 2019, provisional application No. 62/875,796, filed on Jul. 18, 2019.

(51) Int. Cl.
*B23K 3/06* (2006.01)
*B05C 11/10* (2006.01)

(52) U.S. Cl.
CPC ............ *B23K 3/0638* (2013.01); *B05C 11/10* (2013.01); *B23C 2220/48* (2013.01)

(58) Field of Classification Search
None
See application file for complete search history.

(56) References Cited

U.S. PATENT DOCUMENTS

| | | |
|---|---|---|
| 2,359,408 A | 10/1944 | Disse |
| 2,440,099 A | 4/1948 | Kind |
| 2,477,339 A | 7/1949 | Ljungquist |
| 2,783,709 A | 3/1957 | Thomas |
| 2,863,382 A | 12/1958 | Giani |
| 3,071,069 A | 1/1963 | Sherman |
| 3,377,644 A | 4/1968 | Budzinski et al. |
| 3,505,951 A | 4/1970 | Gartrell |
| 3,619,478 A | 11/1971 | Staiger |
| 3,649,991 A | 3/1972 | Grimston et al. |
| 3,670,409 A | 6/1972 | Reimer |
| 3,899,379 A | 8/1975 | Wanesky |
| 4,023,486 A | 5/1977 | Linthicum et al. |
| 4,146,484 A | 3/1979 | Campbell |

(Continued)

FOREIGN PATENT DOCUMENTS

| | | |
|---|---|---|
| GB | 2172542 A | 9/1986 |
| JP | 01212492 A | 8/1989 |

(Continued)

OTHER PUBLICATIONS

Magna-Print™ Universal Squeegee Blade System, retrieved from the Internet at www.ben-technologies.com/support/wp-content/download/magna_datasheet.pdf, on Mar. 27, 2023, 2 pages.

(Continued)

*Primary Examiner* — Jethro M. Pence
(74) *Attorney, Agent, or Firm* — Gesmer Updegrove LLP (57) ABSTRACT

A paste retainer system is disclosed for use in a paste printing system, said paste retainer system comprising a flexible attachment means for attaching a paste retainer to a squeegee holder via a flexible main body.

10 Claims, 15 Drawing Sheets

(56) References Cited

U.S. PATENT DOCUMENTS

| | | |
|---|---|---|
| 4,248,150 A | 2/1981 | Lala |
| 4,254,707 A | 3/1981 | Lambert et al. |
| 4,273,655 A | 6/1981 | Reid |
| 4,404,903 A | 9/1983 | Cronin |
| 4,433,623 A | 2/1984 | Beckim |
| 4,485,736 A | 12/1984 | Strutz, Jr. et al. |
| 4,498,988 A | 2/1985 | Fujita et al. |
| 4,729,306 A | 3/1988 | Bubley |
| 4,759,488 A | 7/1988 | Robinson et al. |
| 4,768,286 A | 9/1988 | Ketcham |
| 4,778,641 A | 10/1988 | Chia |
| 4,810,616 A | 3/1989 | Grabbe et al. |
| 4,818,724 A | 4/1989 | Cetronio et al. |
| 4,859,188 A | 8/1989 | Neumann |
| 4,950,173 A | 8/1990 | Minemura et al. |
| 4,961,893 A | 10/1990 | Rose |
| 4,993,199 A | 2/1991 | Hughes |
| 5,037,599 A | 8/1991 | Olson |
| 5,044,306 A | 9/1991 | Erdmann |
| 5,045,914 A | 9/1991 | Casto et al. |
| 5,054,193 A | 10/1991 | Ohms et al. |
| 5,091,769 A | 2/1992 | Eichelberger |
| 5,095,925 A | 3/1992 | Elledge et al. |
| 5,106,784 A | 4/1992 | Bednarz |
| 5,107,876 A | 4/1992 | Ozyjiwsky |
| 5,123,985 A | 6/1992 | Evans et al. |
| 5,143,102 A | 9/1992 | Blaul |
| 5,164,335 A | 11/1992 | Sato et al. |
| 5,166,184 A | 11/1992 | Hashimoto et al. |
| 5,216,278 A | 6/1993 | Lin et al. |
| 5,218,759 A | 6/1993 | Juskey et al. |
| 5,271,325 A * | 12/1993 | Price .................... B41F 35/003 101/423 |
| 5,301,701 A | 4/1994 | Nafziger |
| 5,303,820 A | 4/1994 | Comtois |
| 5,303,824 A | 4/1994 | Kohn |
| 5,320,226 A | 6/1994 | Merrill |
| 5,345,862 A | 9/1994 | Giard |
| 5,353,498 A | 10/1994 | Fillion et al. |
| 5,354,714 A | 10/1994 | Boysel |
| 5,458,060 A | 10/1995 | Casl |
| 5,461,781 A | 10/1995 | Pirc |
| 5,550,622 A | 8/1996 | Tange |
| 5,576,030 A | 11/1996 | Hooper |
| 5,578,158 A | 11/1996 | Gutowski et al. |
| 5,611,274 A | 3/1997 | Tani |
| 5,632,200 A | 5/1997 | Fukai |
| 5,649,479 A | 7/1997 | Hoffman |
| 5,660,632 A | 8/1997 | Volpe, Jr. et al. |
| 5,704,381 A | 1/1998 | Millan et al. |
| 5,802,970 A | 9/1998 | Tani |
| 5,887,312 A * | 3/1999 | Curtin .................... B23K 3/087 15/245.1 |
| 5,893,325 A | 4/1999 | Sakai |
| 6,022,192 A | 2/2000 | DaLaHoz et al. |
| 6,237,484 B1 * | 5/2001 | Homma ................ B41F 35/005 101/425 |
| 6,267,818 B1 | 7/2001 | Volpe, Jr. |
| 6,397,741 B1 * | 6/2002 | Curtin .................. H05K 3/1233 101/114 |
| 6,585,943 B1 | 7/2003 | Sanford et al. |
| 6,640,712 B2 | 11/2003 | Corti et al. |
| 6,659,002 B2 | 12/2003 | Langdon et al. |
| 6,698,346 B2 | 3/2004 | Shimizu et al. |
| 7,017,489 B2 * | 3/2006 | Perault ................. H05K 3/1216 15/103.5 |
| 7,614,342 B2 * | 11/2009 | Curtin .................. H05K 3/1233 101/425 |
| 7,905,239 B2 | 3/2011 | Kim |
| 8,225,804 B2 | 7/2012 | Publ |
| 8,281,735 B2 * | 10/2012 | Curtin .................... B41F 15/44 118/104 |
| 2002/0170579 A1 | 11/2002 | Lammert et al. |
| 2004/0026444 A1 | 2/2004 | DeSilva et al. |
| 2007/0199578 A1 | 8/2007 | Nomura et al. |
| 2008/0072927 A1 | 3/2008 | Weiss |
| 2009/0133721 A1 | 5/2009 | Campbell |
| 2009/0158943 A1 | 6/2009 | Kobayashi |
| 2009/0217830 A1 | 9/2009 | Eppinger |

FOREIGN PATENT DOCUMENTS

| | | |
|---|---|---|
| JP | 11198347 A | 7/1999 |
| JP | 2006281786 A | 10/2006 |

OTHER PUBLICATIONS

IBM Technical Disclosure Bulletin, Coated Wafer Carriers, vol. 27, No. 10A, Mar. 1985, 2 pages.

IBM Technical Disclosure Bulletin, Card Holder and Lock, vol. 29, No. 1, Jun. 1986, pp. 182-184, 4 pages.

IBM Technical Disclosure Bulletin, Mask Assembly and Wafer Tray, vol. 29, No. 2, Jul. 1986, 2 pages.

IBM Technical Disclosure Bulletin, Multi-Purpose Tote and Insertion System for Generic Material Handling, vol. 31, No. 6, Nov. 1988, pp. 314-315, 3 pages.

IBM Technical Disclosure Bulletin, Standoff Attach Tool, vol. 32, No. 4A, Sep. 1989, pp. 72-73 3 pages.

IBM Technical Disclosure Bulletin, Multiple Substrate Package, vol. 35, No. 4A, Sep. 1992, pp. 264-265, 3 pages.

Non-Final Office Action issued by the United States Patent and Trademark Office in related U.S. Appl. No. 17/015,583 on Nov. 8, 2023, 7 pages.

Non-Final Office Action issued by the United States Patent and Trademark Office in related U.S. Appl. No. 18/408,153 on Jun. 12, 2024, 9 pages.

Final Office Action issued by the United States Patent and Trademark Office in related U.S. Appl. No. 17/015,583 on May 16, 2024, 9 pages.

\* cited by examiner

Figure 1

PRIOR ART

PASTE RETAINER SYSTEMS AND METHODS FOR USE IN PASTE PRINTING SYSTEMS

PRIORITY

The present application claims priority to U.S. Provisional Patent Application Ser. No. 62/875,796 filed Jul. 18, 2019, as well as Ser. No. 62/880,277 filed Jul. 30, 2019, the disclosures of each of which are hereby incorporated by reference in their entireties.

BACKGROUND

The invention generally relates to paste retainer systems, and relates in particular to paste retainer system for use with solder paste printing systems.

Modern electronics manufacturing typically involves, in part, the application of solder paste to a circuit board in a process referred to as solder paste printing. Solder paste printing generally involves using a squeegee blade to push solder paste across a stencil mask. This step is generally referred as the squeegee stroke. During the squeegee stroke, solder paste is pushed and forms a roll. The roll is a cylindrical shape that the solder paste assumes; in fact, when this process is observed, the cylindrical shape appears to be rolling across the stencil surface.

Figure 1:
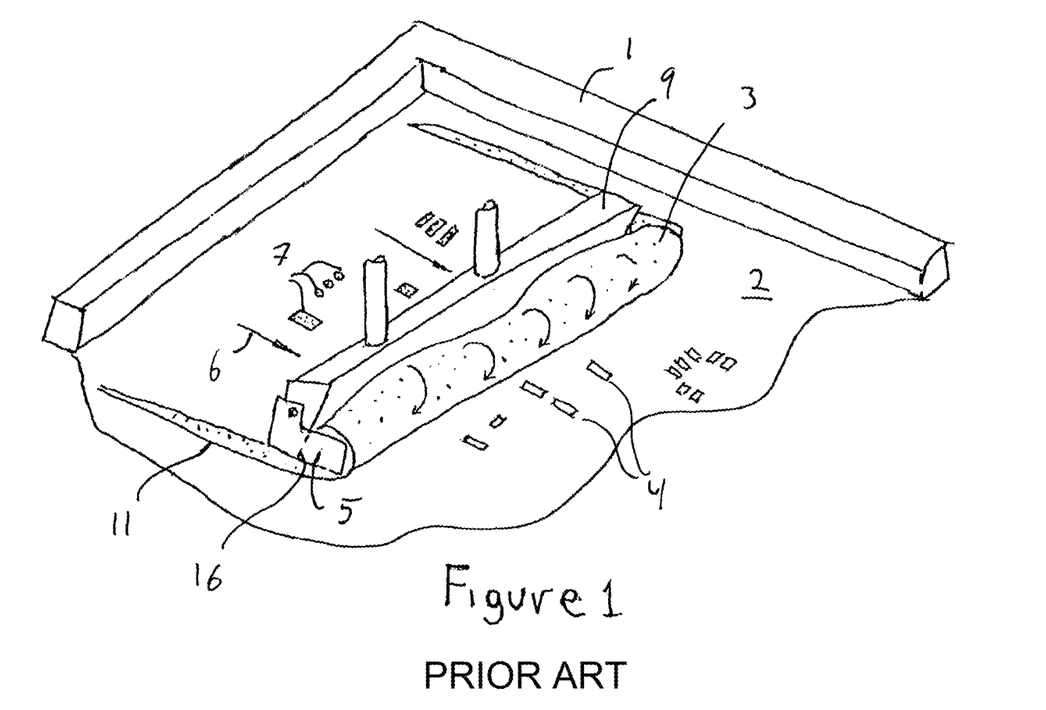
FIG. 1 shows an illustrative diagrammatic view of solder paste printing system of the prior art.

FIG. 1, for example, shows a stencil frame 1, a stencil foil 2, and rolling solder paste 3. The paste retainer is shown at 5, and the direction of the squeegee stroke is shown at 6. Stencil apertures before printing are shown at 4, and stencil apertures filled with solder paste (after printing) are shown at 7. During use, the squeegee holder 9 having a squeegee blade 16 is moved in the direction indicated at 6 by a squeegee head drive mechanism that is connected by rods 8 to the squeegee holder 9. While the squeegee holder 9 moves, some paste may leak out along the sides, referred to herein as paste leakage 11.

Figure 2:
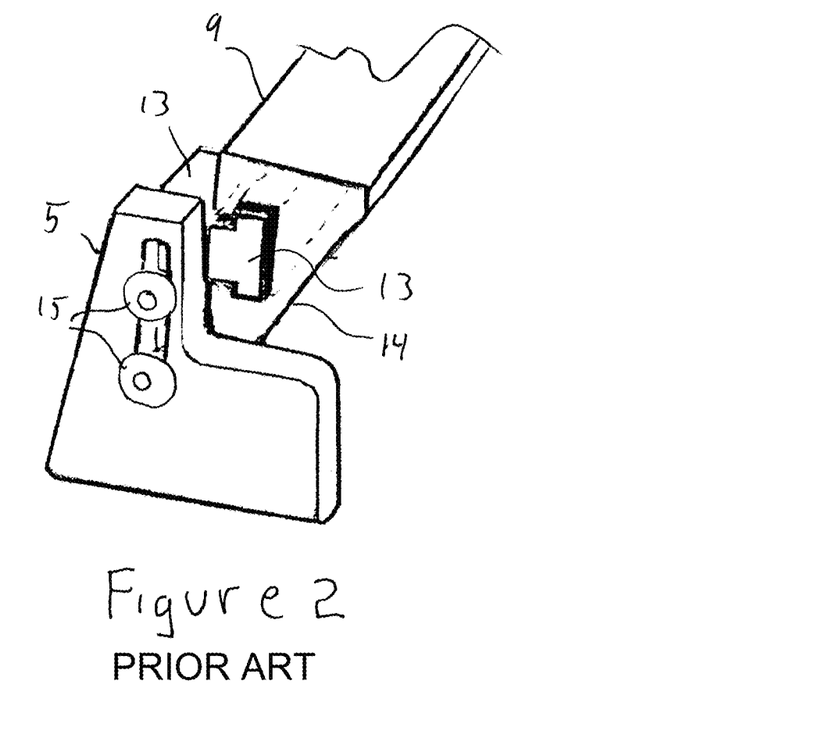
FIG. 2 shows an illustrative diagrammatic enlarged view of one end of the solder paste squeegee of FIG. 1 including a paste retainer of the prior art.
Figure 3:
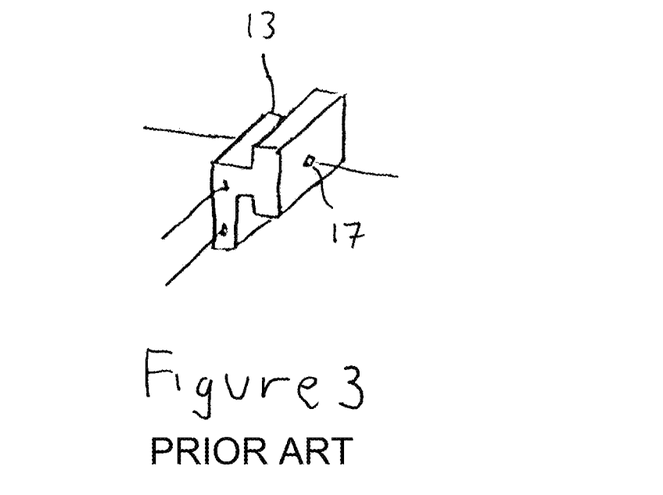
FIG. 3 shows an illustrative diagrammatic view of the T-slide block of the paste retainer system of FIG. 2.

The paste retainers 5 are positioned on the ends of the squeegee holder 9, and serve to retain much of the solder during printing (though some paste leakage 11 may still occur). A typical paste retainer assembly is shown in FIG. 2, which includes a paste retainer 5 and a T-slider block 13. The T-slider block (also shown in FIG. 3) is secured to the squeegee holder 9 by way of one or more set screws passing through tapped holes 17 in the T-slider block 13. The T-slider block extends at least short distance in a cross-processing direction as shown at 14, and the paste retainers 5 are fastened to the ends of the T-slider blocks 13 by screws 15. This type of paste retainer assembly is generally referred to as fixed type paste retainer because the paste retainer cannot move with respect to the squeegee holder once its position is set.

Figure 4:
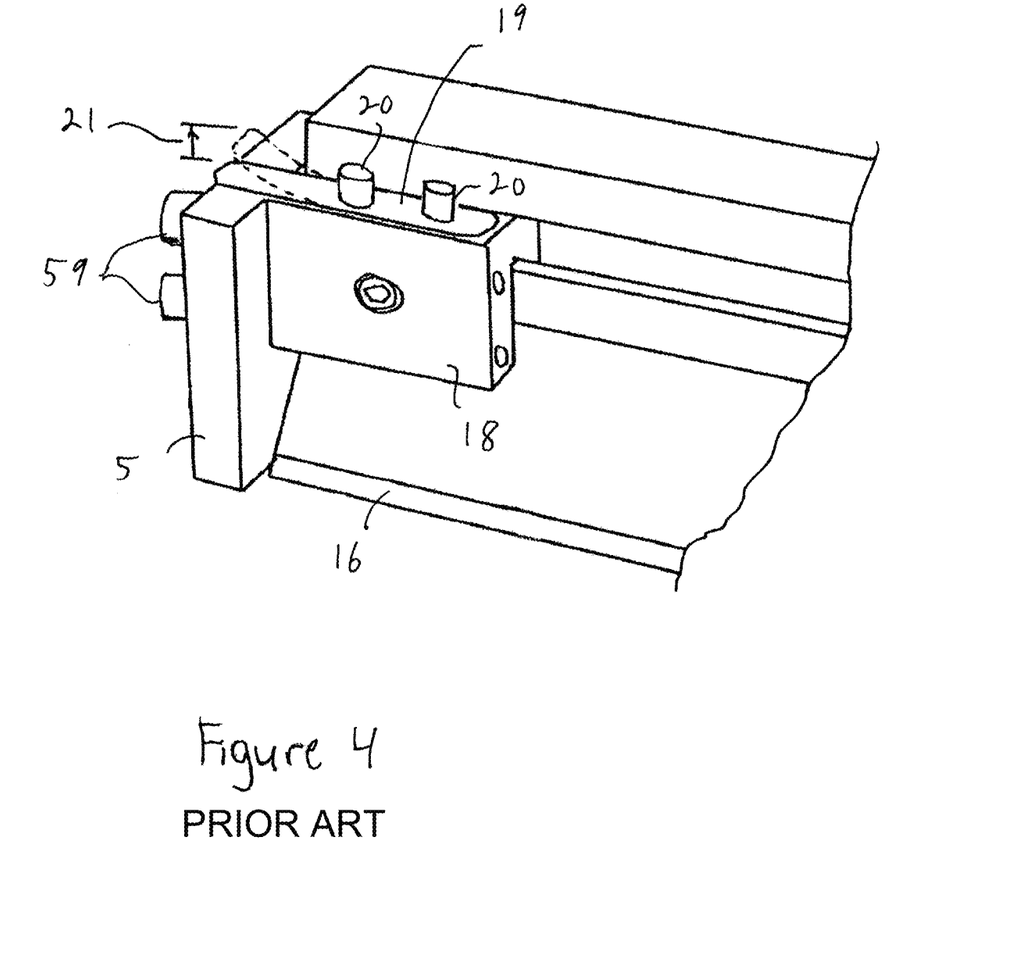
FIG. 4 shows an illustrative diagrammatic view of a portion of a paste retainer system including a spring loaded floating paste retainer assembly of the prior art.
Figure 5:
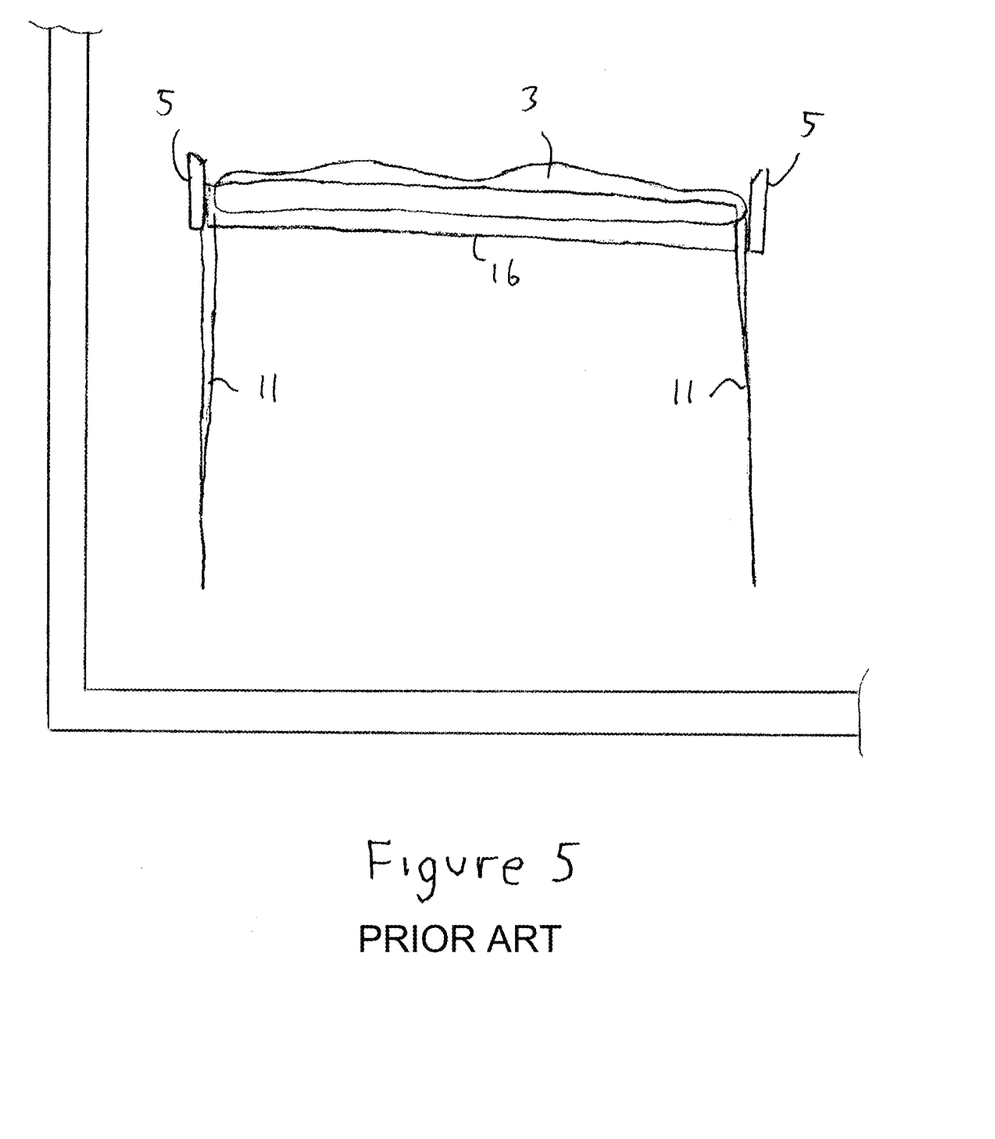
FIG. 5 shows an illustrative diagrammatic top view of a solder paste printing system including the paste retainer system of FIG. 4.

FIG. 4 shows a spring loaded floating paste retainer assembly that has the ability to move while the squeegee is doing the print stroke. This movement is preferred in certain applications to permit the paste retainer to better seal the stencil surface and prevent the flow of solder paste outside of the print area. The spring loaded floating paste retainer assembly of FIG. 4 includes shoulder screws 59 for securing the paste retainers to the T-slider block 18, and the top of the T-slider block 18 includes one or more screws 20 that secure a flexible (e.g., metal) plate 19 to the T-slider block 18 that acts as a spring when paste retainer moves with respect to the associated T-slider block 18. Again, the main purpose of the paste retainers 22 is to prevent leakage of solder paste (paste leakage 11) out the sides of the squeegee 16 during the print stroke as shown in FIG. 5.

There continues to be a need for a paste retainer assembly that is economic and efficient to manufacture, yet that reduces paste leakage in solder paste printing systems.

SUMMARY

In accordance with an aspect, the invention provides a paste retainer system for use in a paste printing system. The paste retainer system includes a flexible attachment system for attaching a paste retainer to a squeegee holder via a flexible main body.

In accordance with another aspect, the invention provides a paste retainer system for use in a paste printing system. The paste retainer system includes an attachment means for attaching a paste retainer to a squeegee holder via a main body that permits flexible movement in a primary direction with relatively little movement in a second direction that is orthogonal to the primary direction.

In accordance with a further aspect, the invention provides a method of making a main body for a paste retainer system. The method includes milling out a milled out portion of a main body block, and processing the milled out portion to provide a flexible attachment for attaching a paste retainer to a squeegee holder.

BRIEF DESCRIPTION OF THE DRAWINGS

The following description may be further understood with reference to the accompanying drawings in which.

The drawings are shown for illustrative purposes only.

DETAILED DESCRIPTION

In accordance with an aspect, the invention provides a highly functional paste retainer system that is formed by a unique design that incorporates low cost components and is low in cost to manufacture, yet is highly functional.

Figure 6A:
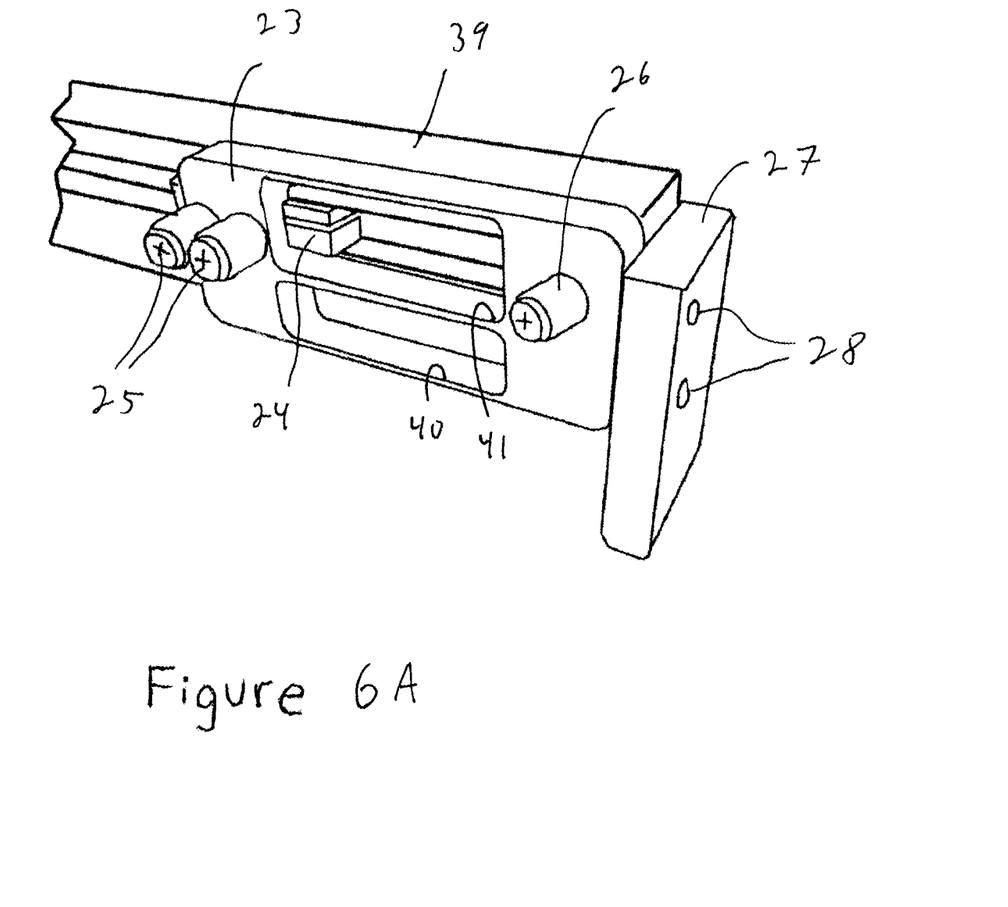
FIGS. 6A and 6B show illustrative diagrammatic views of a paste retainer system in accordance with an aspect of the invention.
Figure 6B:
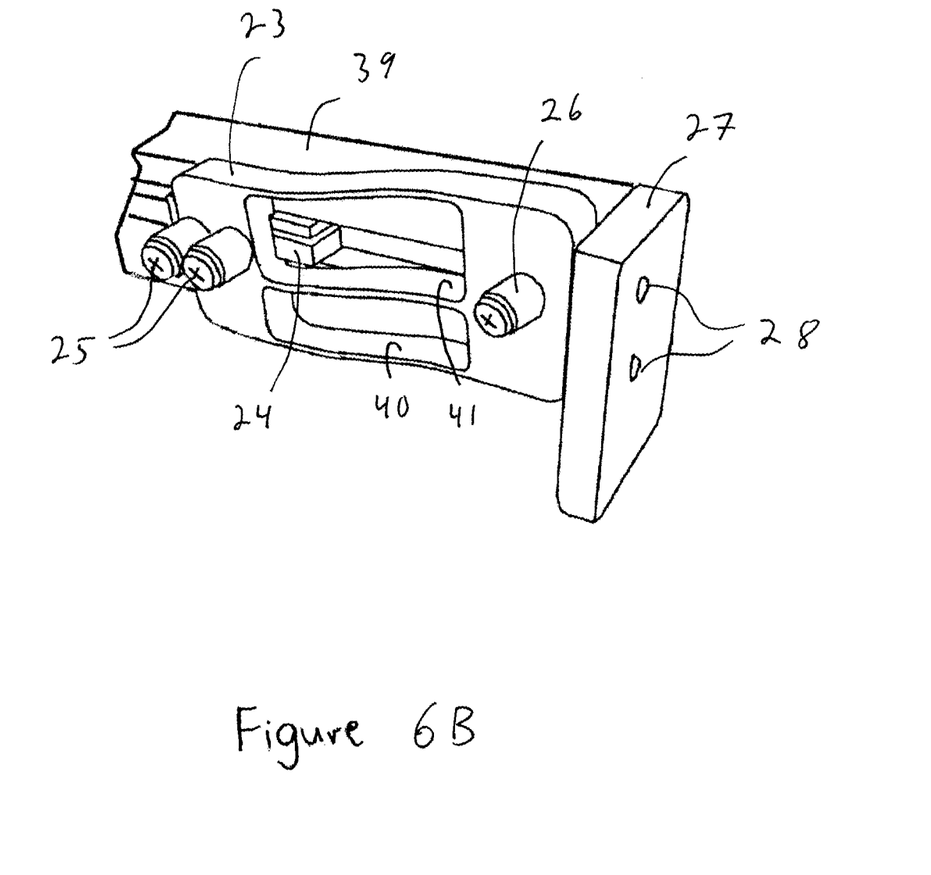
Figure 7A:
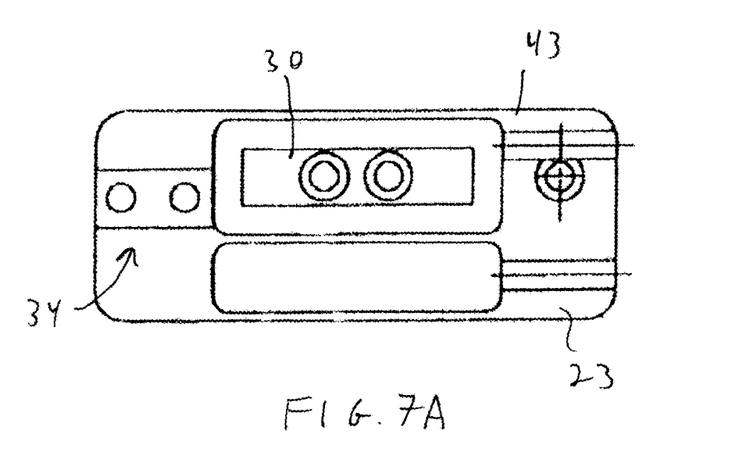
FIGS. 7A-7C show illustrative diagrammatic views of a portion of the paste retainer system during manufacturing of the paste retainer body and slit block.
Figure 7B:
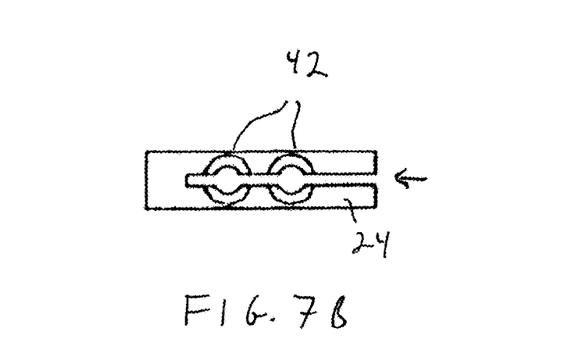
Figure 7C:
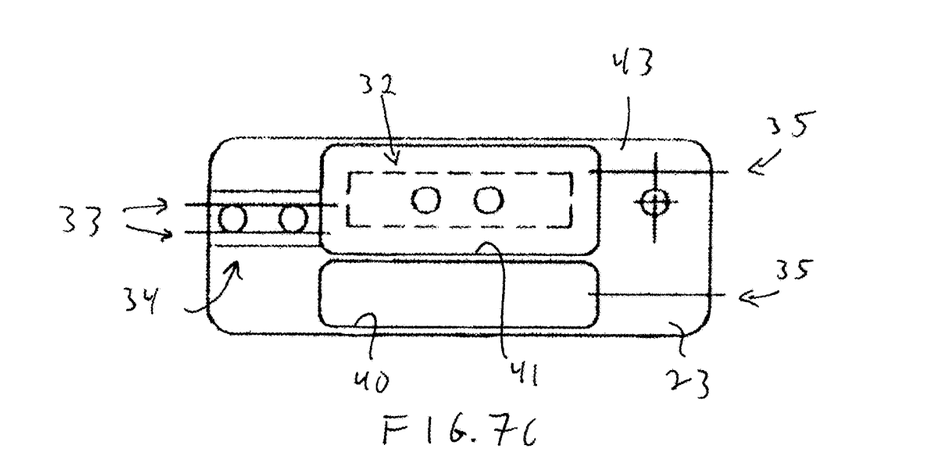

In accordance with certain embodiments of the invention, the paste retainer assembly includes a flexible main body 23 that has two rectangular openings 40, 41 cut through the body to provide a geometry that is flexible in one direction to provide a spring action, but is much more stiff in other directions as shown in FIGS. 6A and 6B. The unique geometry is much less expensive to manufacture as compared to assemblies that include a T-slider block and spring as discussed above. The paste retainer assembly of FIGS. 6A and 6B incorporates a split block 24 that expands when screw assemblies 25 are tightened. The assembly also includes paste retainer(s) 27 (only one is shown) secured to the squeegee holder as discussed in more detail below. The paste retainer(s) are secured to the flexible main body 23 via screws 28.

Figure 9:
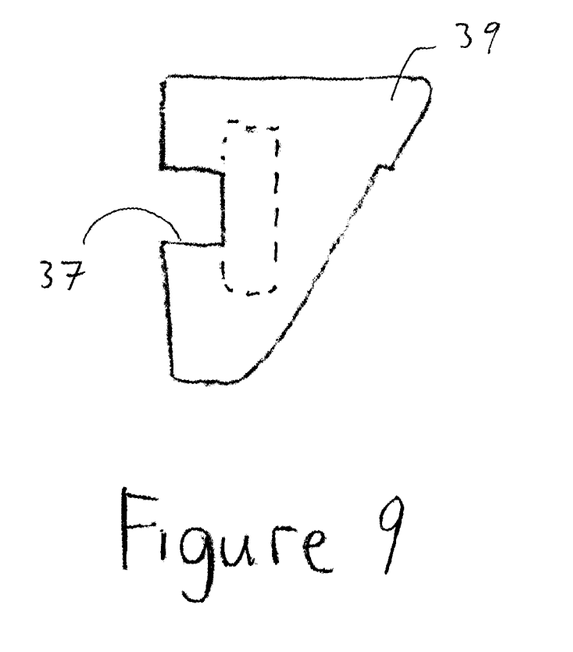
FIG. 9 shows an illustrative diagrammatic view of a portion of the squeegee holder for locking the paste retainer to the flexible mount body.

With reference to FIG. 6B, the paste retainer 27 is permitted to move with respect to the squeegee holder 39 in a controlled directional fashion, ensuring that the paste retainer remains vertically aligned (does not rotate). This is achieved through use of the split block 24 into which the screws 25 are mounted. The wedge item (shown in FIG. 9) serves to lock the paste retainer to the squeegee holder by expanding inside of a ¼ inch wide by 3/16 deep rectangular channel 37 that is added to the squeegee holder. The use of a ¼ inch channel is much preferred to that of the T-slot of the prior art, at least because a rectangular channel is easier to manufacture.

The manufacturing process is diagrammatically shown in FIGS. 7A-C and 8A-8C. In particular and with reference initially to FIGS. 7A-7C, the process involves use of a generally rectangular piece of ¼ inch thick black delrin 0.9 inches×2 inches machined using a ⅛ inch endmill from which the split block is formed as generally shown at 30 in FIG. 7A and at 32 in FIG. 7C. The machining process is greatly simplified whereas this ⅛ inch endmill produces two rectangular openings 40, 41 and produces ⅛ inch square slots 36, by milling lines 35. A further channel is also provided that is ¼ inch wide by 1/16 inch deep by milling lines 33 shown in FIG. 7C. Out of pocket milling results in the split wedge part 30 (which becomes part 24 shown in the lower left), leaving the opening 41. A finishing operation involves cutting the split block 30 down the middle with a band saw, and adding c-sink geometry to the two holes 42 as shown at 34 in FIG. 7B.

Figure 8A:
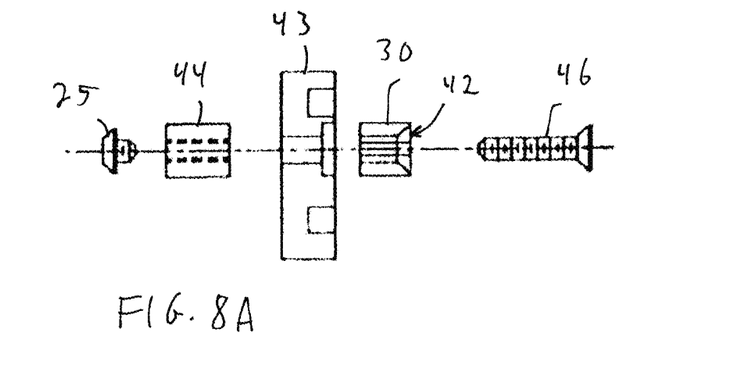
FIGS. 8A-8C show illustrative diagrammatic views of a portion of the paste retainer systems during assembly of the paste retainer mount for coupling to the wedge block.
Figure 8B:
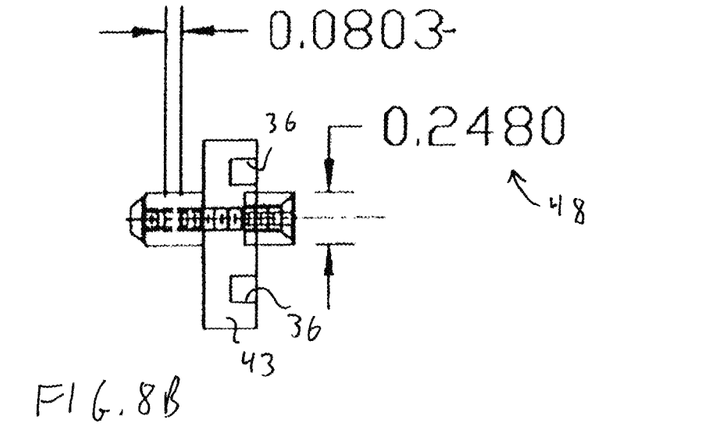
Figure 8C:
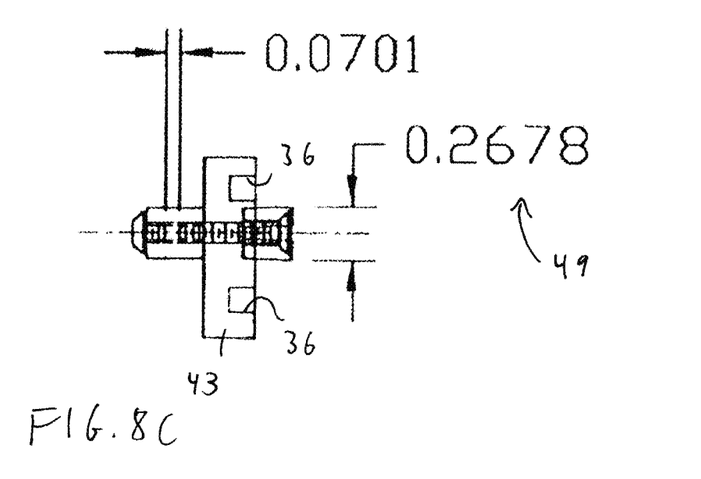

FIG. 8A shows how the wedge block 30 fits to the flexible paste retainer mount 43. A low cost threaded spacer 44 and screw 45 serve to join with a flat head screw 46. The assembly may be set into the squeegee holder channel 37, and when the screw 47 (in FIG. 8C) is tightened, the wedge block splits open and expands thereby locking both the split lock block 24 and the flexible paste retainer mount 43. The expansion is shown by dimension 48 (0.2480) in FIG. 8B changing to dimension 49 (0.2678) shown in FIG. 8C. Again, the wedge item serves to lock the paste retainer to the squeegee holder by expanding inside of a ¼ inch wide by 3/16 deep rectangular channel 37 that is added to the squeegee holder as discussed above and shown in FIG. 9.

Figure 10:
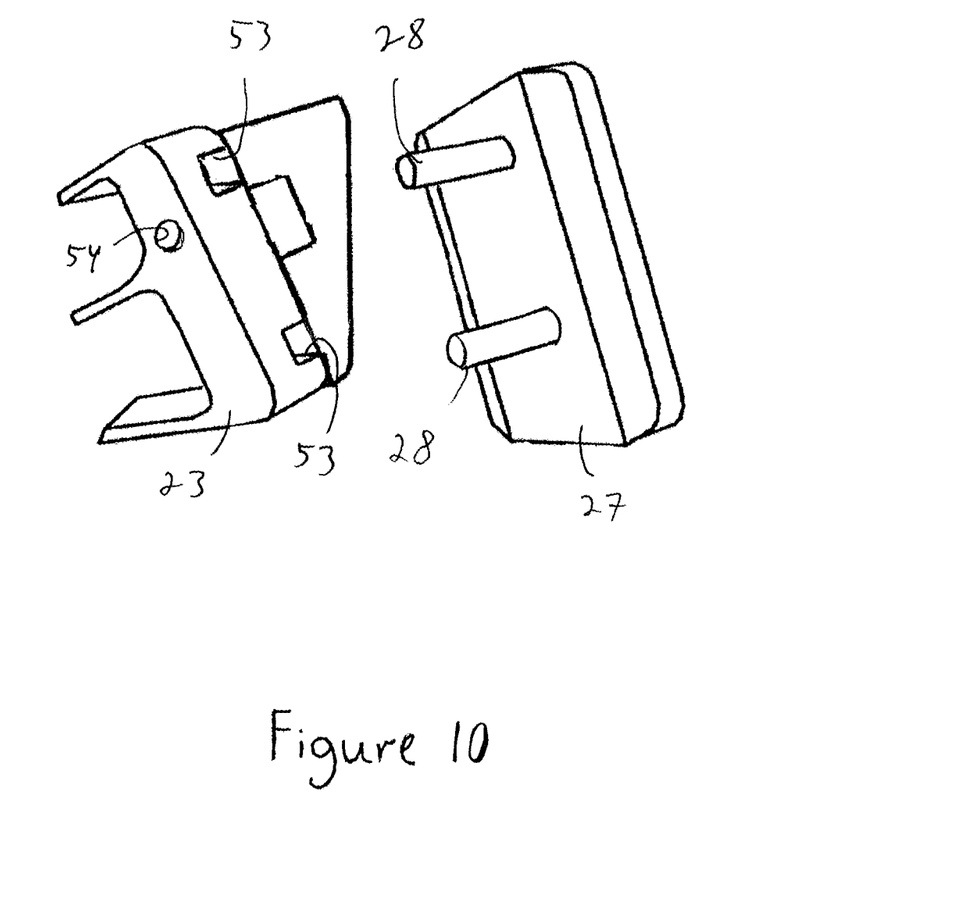
FIG. 10 shows an illustrative diagrammatic view of a locking mechanism that employs a flat head screw.
Figure 11:
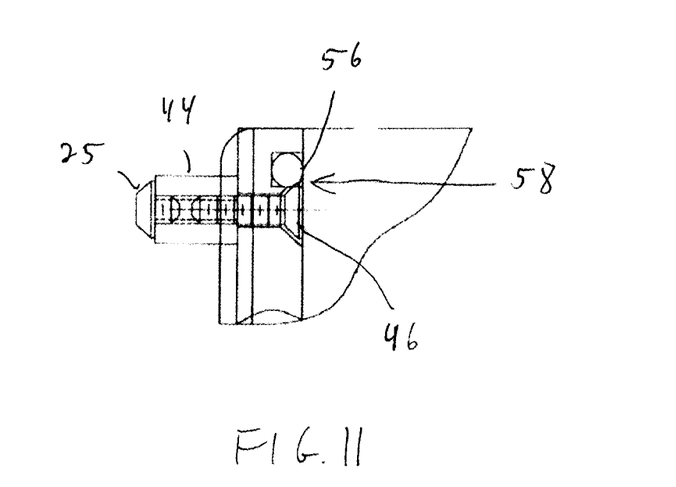
FIG. 11 shows an illustrative diagrammatic view of a locking mechanism for use in a paste retainer holder system that employs a pin that is locked by a screw.
Figure 12:
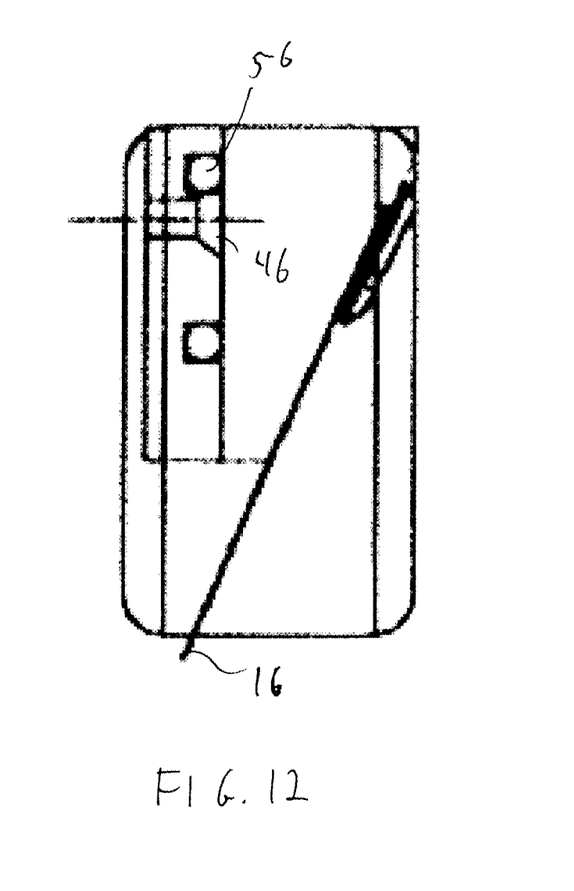
FIG. 12 shows an illustrative diagrammatic side view of the squeegee blade holder.

Another aspect of the design of aspects of the invention, involves the locking method used to hold the paste retainer 27 to the flexible main body 23. The channels 53 in (FIG. 10) created by the ⅛ inch endmill machining milling lines (33 in FIG. 7C) create a sturdy channel to hold and align two pins 28 that are attached to and extend from the paste retainer 27. FIG. 10 shows how a low cost 4-40 flat head screw is used to lock the pin 28 to the flexible main body 23 using hole 54. FIG. 11 shows at 58 an interface that causes a pin 56 to be locked by the screw 46. FIG. 12 shows a diagrammatic side view of the squeegee blade holder assembly.

The assembly provides a flexible spring loaded paste retainer that is readily attached and removed from the squeegee holder, and is easily manufactured at a low cost, yet has exceptional rigidity in directions other than a direction of permitted movement of the paste retainer with respect to the squeegee holder. The fabrication process involves significantly fewer machining operations and no tapped holes or T-slots.

The spring loaded paste retainer and method of manufacture eliminates the need for separate should screws 59 (in FIG. 4) to maintain the vertical up-down sliding motion of the paste retainer, and the two tapped holes for the screws are eliminated as well as the spring item 19 and the two tapped holes and screws 20.

Paste retainers of the invention are also unique because they avoid using expensive high cost components, and the components employed are used in an unconventional way to provide stealthy function giving the retainer system a sleek look and smooth profile shape (important in paste printing), while having spring loaded flexibility.

In accordance with the above embodiments, the screws 46 cause the split block 24 to split. In certain embodiments however, the screws 46 may loosen or turn on their own, for example, if the material (e.g., plastic) from which the split block 24 is formed has a low coefficient of friction, potentially fowling the function of the screws and the split block 24. One solution in accordance with various embodiments is to provide the split block 24 from a different material such as aluminum.

Figure 13:
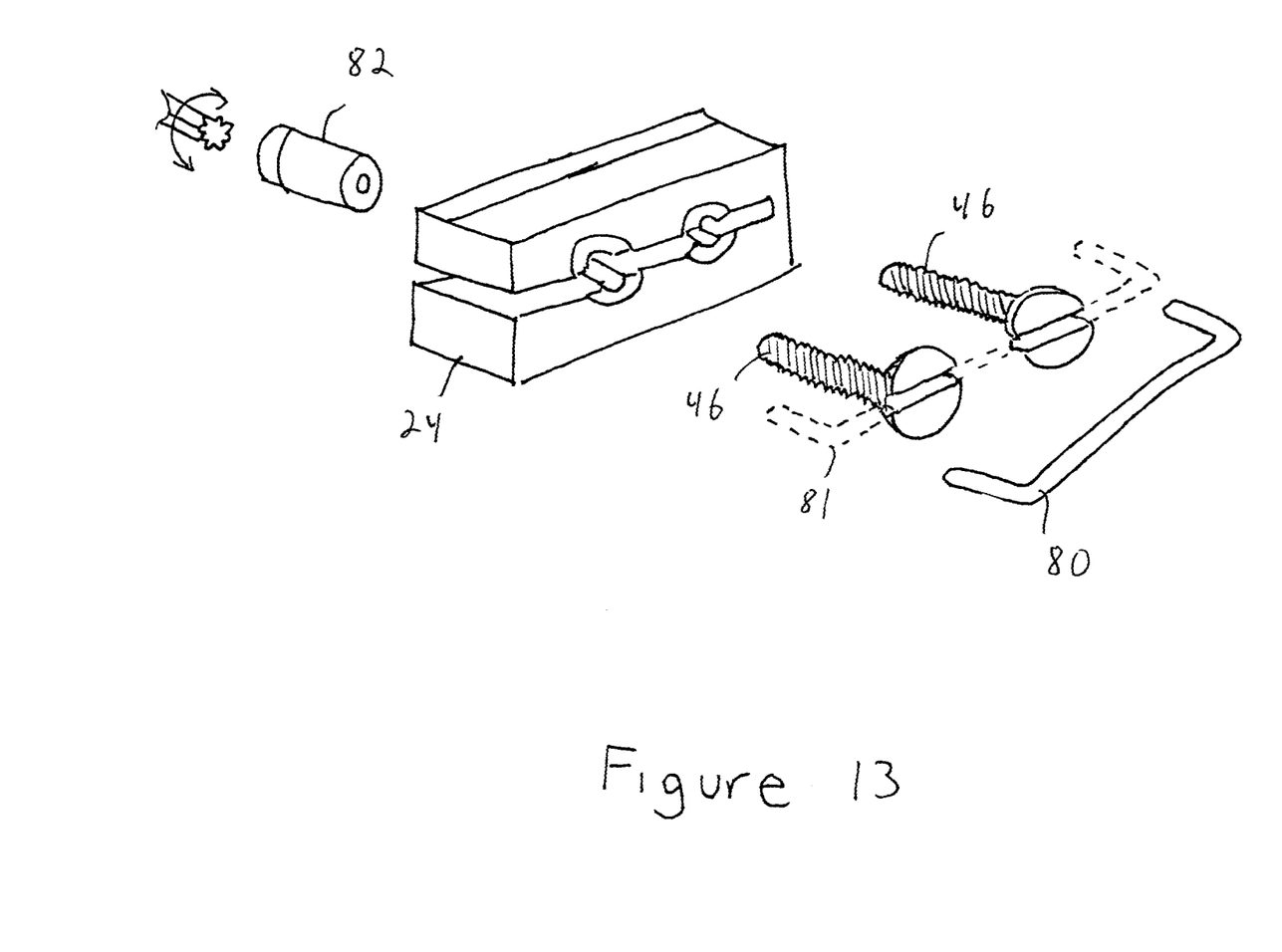
FIG. 13 shows an illustrative diagrammatic view of a split bock locking system that employs flat head locking screws.

In accordance with further aspects, the invention may provide that the screws 46 become locked as follows. FIG. 13 for example, shows a split block locking system in accordance with an aspect in which the split block 24 is adjusted by screws 46, which are flat head regular screws with the flat head slot passing all the way across each screw head. The screws are tightened to the desired position with the slots of the flat head screws lining up with each other as shown in FIG. 13. A cross-member (e.g., a bent form of wire) 80 is then secured into the slots of the aligned flat head screws as shown at 81. When the wedge block is tightened by the button head screw 82 (which also serves to pull the flat head screws so that they push the two halves of the wedge block apart), the screws 46 will not turn.

Figure 14:
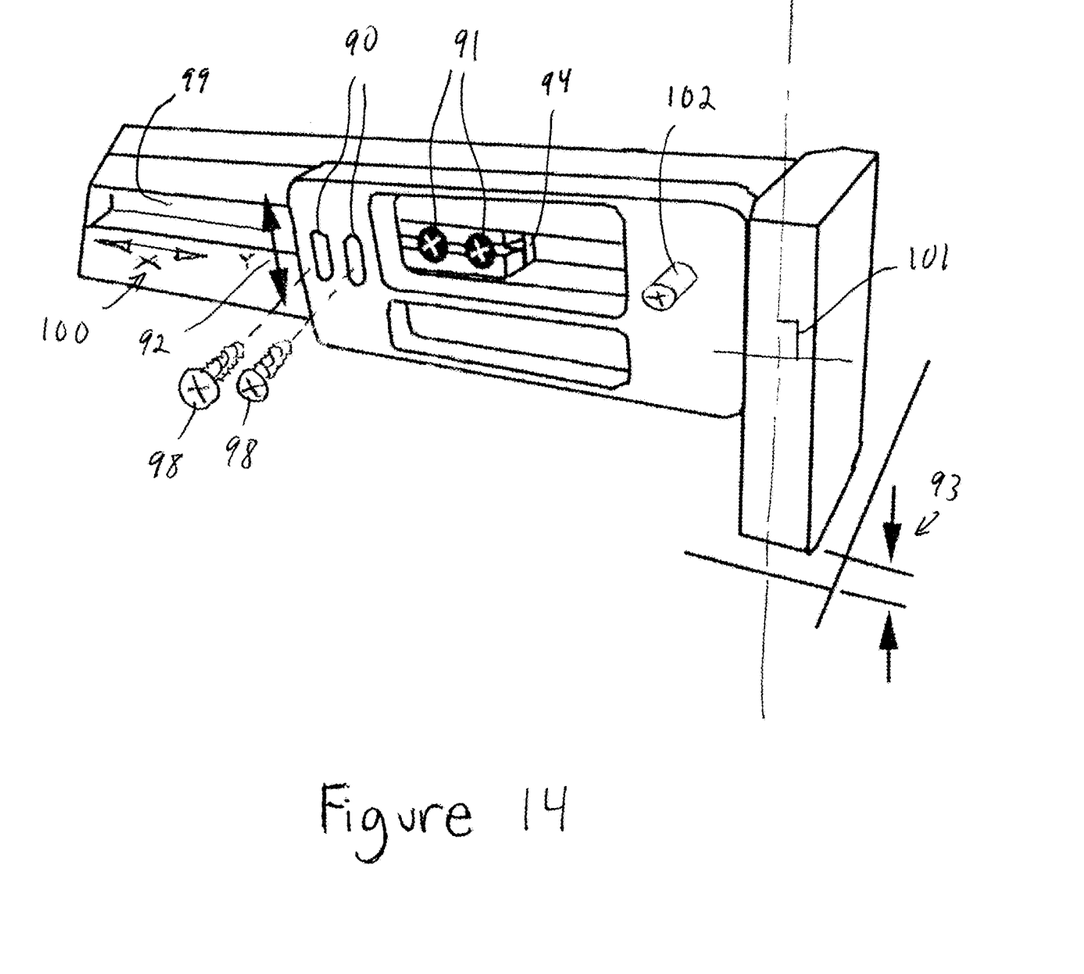
FIG. 14 shows an illustrative diagrammatic view of a paste retainer system in accordance with another aspect of the invention that employs wedge locking screws.
Figure 15:
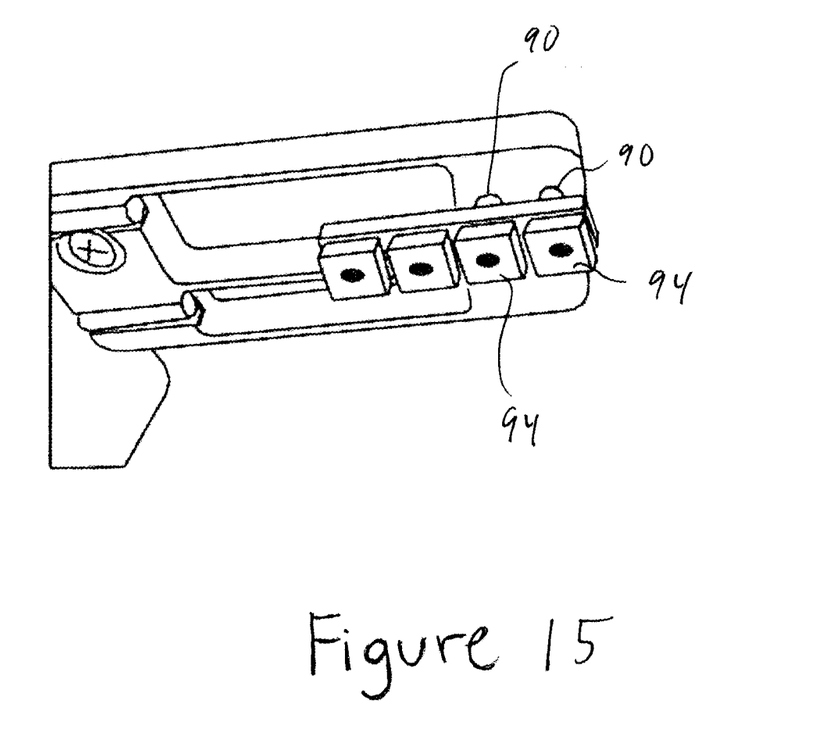
FIG. 15 shows an illustrative diagrammatic view of a back side of the wedge block of FIG. 14 showing the use of square nuts.
Figure 16:
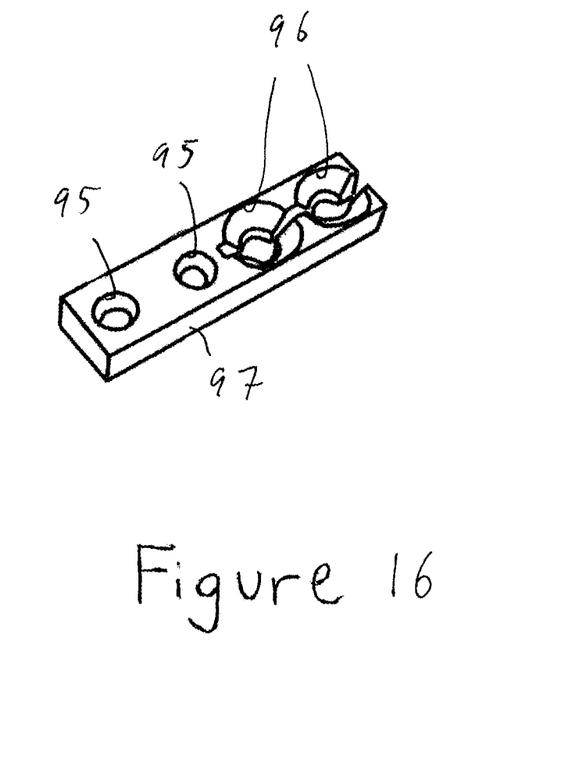
FIG. 16 shows an illustrative diagrammatic view of the wedge block assembly of the system of FIG. 14.

In accordance with yet further aspects, the invention may provide that a wedge block assembly 97 that includes two wedge locking screws 91 that are separated from the body mounting screws 98 as shown in FIGS. 14-16. The wedge block as shown in FIG. 16 has two wedge lock C-sink positions 96 and two body mounting holes 95. The arrangement has forward facing screws 91 shown in FIG. 14 that screw into square nuts (e.g., 4-40$^{th}$ d) 94. The square nuts are approximately 0.248 inch square, which allows them to slide in the channel 99 giving the assembly adjustability along the x-axis 100. The whole body may be adjusted along the y-axis 92 by the addition of slotted holes 90 as shown in FIG. 14. This adjustability is important so that users may close the gap 93 that exists for their particular printing application. Combining these new features, the paste retainer assembly accomplishes adjustability in x and y directions, and provides spring loaded past retainer movement in the y direction without any pivot movement, indicated by the right angle symbol shown at 101 (shown in FIG. 14). Further, the assembly provides quick and easy paste retainer locking and removal using locking device 102. The square nuts (shown in FIG. 15) provide a more reliable screw engagement to secure the wedge lock and body mounting.

Those skilled in the art will appreciate that numerous modifications and variations may be made to the above disclosed embodiments without departing from the spirit and scope of the present invention.

What is claimed is:

1. A paste retainer system comprising: a paste retainer attached to each of an extreme end of a squeegee holder, the squeegee holder adapted to mount a squeegee for use in a paste printing system, the paste retainer providing containment of paste from leakage at each of the extreme end of the squeegee holder, said paste retainer system comprising a flexible attachment means for attaching the paste retainer to the extreme end of the squeegee holder via a flexible main body, the paste retainer being constrained from rotation relative to the squeegee holder.

2. The paste retainer system as claimed in claim 1, wherein the flexible main body permits flexible movement of the paste retainer in a first linear direction.

3. The paste retainer system as claimed in claim 1, wherein the flexible attachment means includes a split block.

4. The paste retainer system as claimed in claim 3, wherein the split block includes at least two holes with c-sink geometry.

5. The paste retainer system as claimed in claim 1, wherein the paste retainer system further includes locking attachment means for attaching the paste retainer to the flexible main body.

6. The paste retainer system as claimed in claim 5, wherein the locking attachment means includes a protrusion attached to the paste retainer that is engageable with a fastening device on the flexible main body.

7. The paste retainer system as claimed in claim 6, wherein the fastening device includes a flat head screw that engages a protrusion on the paste retainer.

8. The paste retainer system as claimed in claim 7, wherein the protrusion on the paste retainer is provided as a cylinder.

9. The paste retainer system as claimed in claim 8, wherein the protrusion on the paste retainer is received in a rectangular opening on the flexible main body.

10. The paste retainer system as claimed in claim 1, wherein the flexible main body includes at least one rectangular opening that permits flexibility in one direction.

* * * * *